United States Patent
Gunness

(10) Patent No.: US 9,823,161 B2
(45) Date of Patent: Nov. 21, 2017

(54) LEAK DETECTION AND LOCATION SYSTEM AND METHOD

(71) Applicant: Clark Robert Gunness, Nashville, TN (US)

(72) Inventor: Clark Robert Gunness, Nashville, TN (US)

(*) Notice: Subject to any disclaimer, the term of this patent is extended or adjusted under 35 U.S.C. 154(b) by 472 days.

(21) Appl. No.: 14/107,694

(22) Filed: Dec. 16, 2013

(65) Prior Publication Data

US 2015/0168329 A1    Jun. 18, 2015

(51) Int. Cl.
| | | |
|---|---|---|
| *G01N 27/22* | (2006.01) | |
| *G01M 3/40* | (2006.01) | |
| *G01M 3/16* | (2006.01) | |
| *E04D 13/00* | (2006.01) | |

(52) U.S. Cl.
CPC ............ *G01M 3/40* (2013.01); *E04D 13/006* (2013.01); *G01M 3/16* (2013.01)

(58) Field of Classification Search
CPC ............ G01M 3/40; G01M 3/16; G01M 3/00; G01M 3/165
See application file for complete search history.

(56) References Cited

U.S. PATENT DOCUMENTS

| | | | |
|---|---|---|---|
| 2010/0127848 A1* | 5/2010 | Mustapha | G08B 21/20 340/505 |
| 2010/0141283 A1* | 6/2010 | Vokey | C23F 13/02 324/705 |

* cited by examiner

*Primary Examiner* — Mohamed Charioui
*Assistant Examiner* — Jeremy Delozier
(74) *Attorney, Agent, or Firm* — Catherine Napjus; Michael Persson; Lawson, Persson & Chisholm, PC

(57) ABSTRACT

The system of the present invention is used for detecting and locating leaks in a roofing envelope that includes an insulation package. The system includes at least two contacts disposed within the roofing envelope, where at least one contact is active and at least one is passive. The active contact is capable of emitting an electric signal of a known voltage, and the passive contact is capable of reading voltage at the location of the passive contact. All contacts are in electrical communication with a computer.

8 Claims, 5 Drawing Sheets

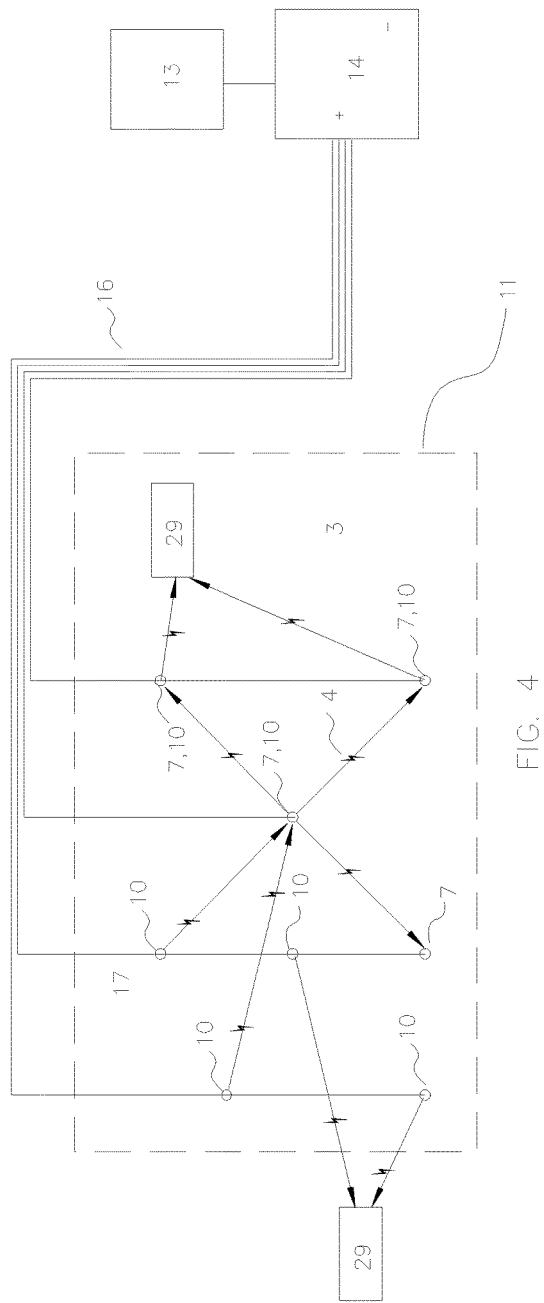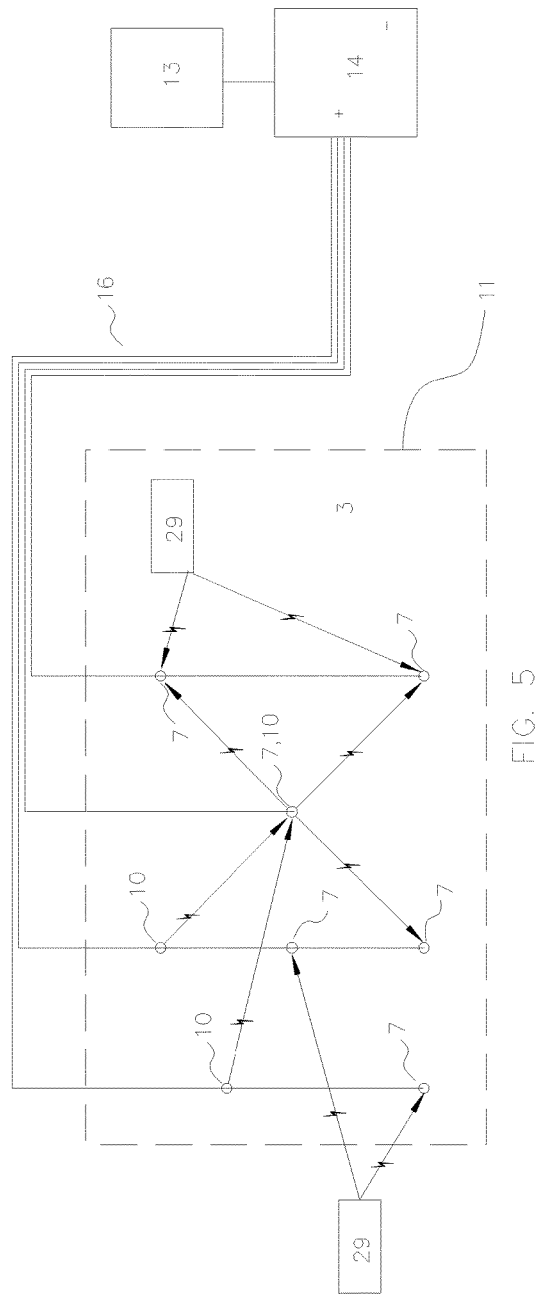

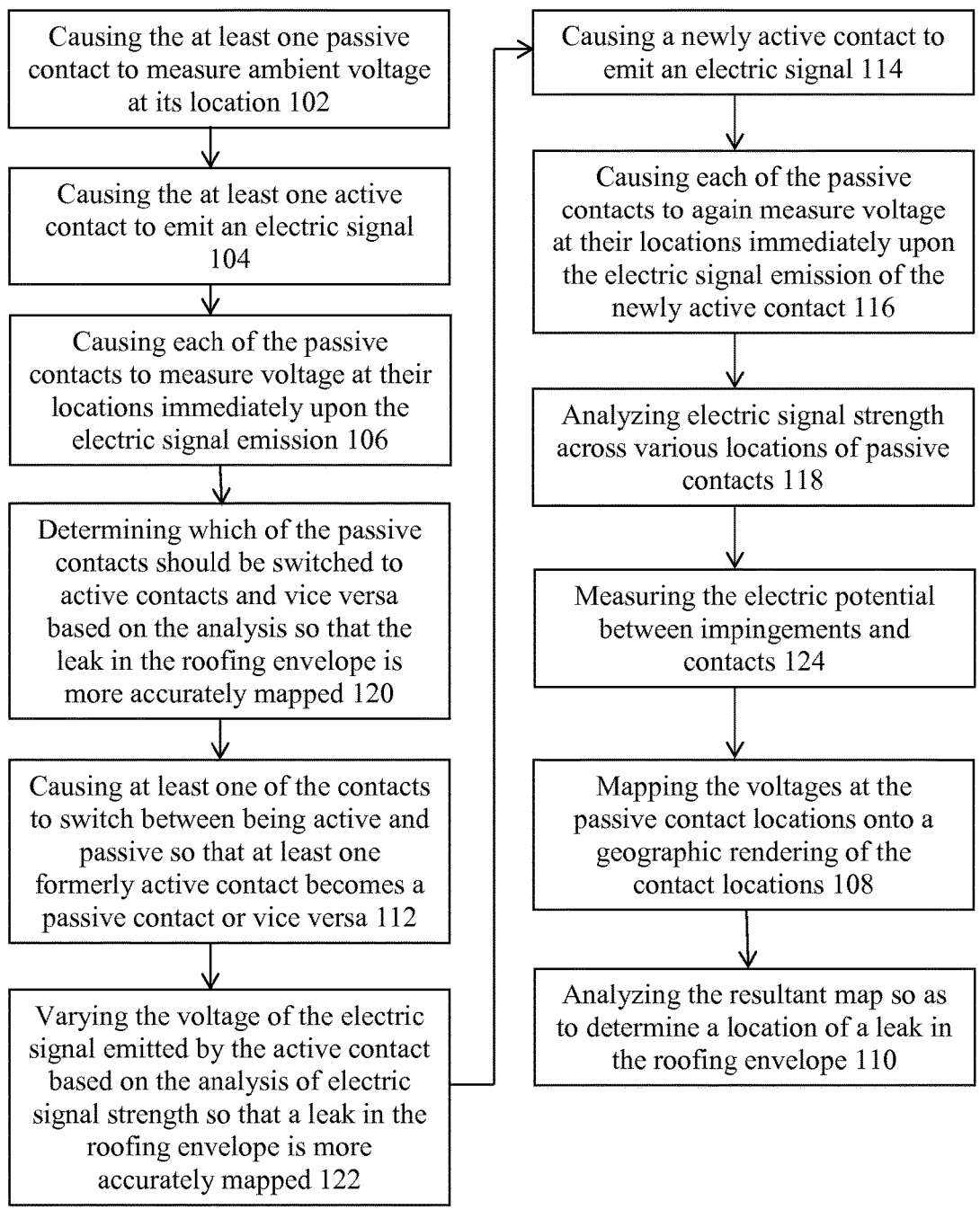

LEAK DETECTION AND LOCATION SYSTEM AND METHOD

FIELD OF THE INVENTION

The present invention relates to the detection and location of water leakage in structures, and in particular to computer controlled leakage detection and location systems for structures with a roofing envelope including essentially electrically non-conductive material.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and, in recent history, electrical testing methods that not only determine if a leak is present in a membrane system, but where the leak is located.

Leakage in existing roofs is a particular problem, especially when the roof has a nonconductive element at the bottom of the roofing envelope next to the deck, such as a vapor barrier or a secondary roofing membrane. In these cases, water leaking into the roofing envelope can saturate the insulation and other elements in the envelope without actually leaking into the building because the lowermost membrane acts as a barrier to the water. In time, water might run into the building via penetrations, such as vent stacks, curbs for mechanical equipment, conduits etc., through the roofing envelope and be visible from underneath. By this time, corrective action may encompass cutting cores in the roofing envelope to determine the extent of water damage; removing a large portion of the roof; performing infrared or other tests to indicate the current status of the roofing envelope; etc.

Additionally, when the roofing envelope becomes saturated with water, a portion of the planned energy efficiency from the roofing envelope is lost. The building structure may also experience the corrosive effects of water, therefore compromising its penetrations. Unbeknownst to anyone, this process is occurring in thousands of roofs across North America and, indeed, in the built environment anywhere in the world.

There are methods that have been developed to address the above described problems including manual methods, such as capacitance testing, infrared scanning, and moisture probing. In addition, there are automatic systems driven by computers with sensors built into or retrofitted into the non-conductive insulation and other non-conductive materials which comprise the roofing envelope.

One known method of placing such an automatic system into a non-conductive envelope is to install relative humidity sensors in the roofing envelope, where the sensors measure humidity and temperature. An array of such sensors can give a representation of moisture conditions in a roofing envelope. Such a system is provided by Progeo GmbH of Germany and other vendors, and these systems have been used on projects in the United States. Such systems are limited in that the sensors require a certain amount of free air around them in order to determine the ambient moisture content of any part of the roofing envelope, and each sensor is only one point, measuring the relative humidity of a very small area around its location. Further, there is no guarantee that any air will circulate in the roofing envelope, and if the free flow of air is cut off, especially given the impermeable nature of closed-cell insulations in today's roofing envelopes, the sensors will not be able to sense variations in moisture, but only temperature changes.

The computer attached to such a system is given the task of correlating all the data received from the sensors in these distinct, small areas, and of producing a table, graph, or other graphic based on the extrapolations of these data. In order for the data to be at all relevant, the computer must make a correlation reading from a sensor located on the outside of the roofing envelope so that it can compare trends in relative humidity on the outside of the roof to the trends being determined by data from the sensors within the roofing envelope. The results are skewed when the temperature changes within the roofing envelope, outside the roofing envelope, or both. The skew is particularly pronounced when temperature changes precipitously, and a certain amount of time is required, sometimes days or weeks, before the system can stabilize enough to produce relevant data again. Even so, relevant data can only be surmised, as the circulation of free air in the roofing envelope cannot be adequately determined, especially across the entire expanse of the envelope. If these systems are retrofitted using tubes inserted into holes cut into the roofing envelope, the temperature sensed in the tubes is different from the actual temperature in the roofing envelope as a whole, and incorrect temperature and the contingent relative humidity measurements are inaccurate, causing false leakage alerts. Further, in order to make such a system more responsive or accurate, sensors must be deployed much closer to one another so the computer will have a greater number of points from which to draw and extrapolate data, driving the cost of the system up. In summary, such systems have significant drawbacks. In addition, the Inventor has developed several automatic systems, such as those disclosed in U.S. Pat. Nos. 8,566,051, 9,341,540, and 9,500,555 and U.S. patent application Ser. No. 14/061,480, each of which is hereby incorporated by reference.

Another known automatic system requires a grid of hydrophobic cables, the cross-over points of which, when wetted from water flowing through the roofing membrane, make a closed circuit that identifies which portion of the grid is wet and allows location of the leakage through the membrane. This system requires water to make its way to the cross-over points to trigger an alarm and a significant flooding of a portion of the roofing envelope might occur before an alarm is tripped. Such a system is sold under the trademark DETEC.

SUMMARY OF THE INVENTION

The present invention is a system and method for detecting leaks in roofing envelopes which include insulation under a roofing membrane.

The system of the present invention is used for detecting and locating leaks in a roofing envelope where the roofing envelope includes a roofing membrane, which is disposed on top of an insulation package, which is, in turn, disposed on top of a roof deck. The roofing membrane may also include a vapor barrier below the insulation package. The roofing envelope may also include at least one impingement, which penetrates at least the roofing membrane. As used herein, "an insulation package" is any type of electrically non-conductive layer between the roofing membrane and the roof deck, such as insulation, padding felt, wood, or other non-conductive building materials. Hereinafter, the term "impingements" should be understood to include anything that penetrates a waterproofing membrane, such as penetrations and impinging walls. Examples of penetrations include vent stacks, curbs for air conditioning units, and fan units. Impinging walls are walls that border a roof area, as well as parapets that run through a roof. Any wall that has roof flashing up against it in order to make the roofing envelope watertight at that juncture is an impinging wall. "Impingement" refers to any of the structures included within either of these terms that impinge on or interrupt a waterproofing or roofing membrane. Although impingements usually impinge on all roofing membranes included in a multi-layered roofing and waterproofing membrane assembly, it is understood that some impingements may impinge on only one or less than all layers.

In its most basic form, the system of the present invention includes at least two contacts disposed within the roofing envelope, where at least one contact is an active contact and at least two are passive contacts. The active contact is capable of emitting an electric signal of a known voltage, and is in "transmitting" or "firing" mode. The passive contacts are capable of reading voltage at the location of the passive contact, and are in "listening" mode. The contacts may be any electrode or sensor commonly used in the art so long as it is capable of both emitting and receiving an electric signal. The terms "contact," "sensor," and "electrode" may be used interchangeably herein, and all terms refer to this system element. All contacts are in electrical communication with a hub and computer or controller that controls the provision of the signal to the active contact or active contacts and receives and measures signal data from the passive contact or passive contacts It is preferred that the contacts are either disposed on top of the roof deck and below the insulation package, or within the insulation package.

In preferred embodiments, the computer includes a processor, a memory, and a software product and the software product includes means for switching an active contact to a passive contact and vice versa. In such embodiments, the contact could either emit or receive an electrical signal depending on its state. A plurality of contacts that are capable of both generating and receiving an electrical signal may do so individually or in predetermined groups. The software product may also include means for analyzing the electric signal strength across the various locations of the passive contacts and determining which of the passive contacts should be switched to active contacts and which of the active contacts should be switched to passive contacts based on the analysis, so that a leak in the roofing envelope is more accurately identified. The software product may also include means for varying the voltage emitted by the active contact based on the analysis.

It is preferred that the distances between the contacts is known, and particularly that they are arranged in some sort of matrix. It is also preferred that at least one of the contacts is disposed proximate to an impingement on the roofing membrane. In this case, "proximate" means that, if the contact is passive, it is near enough to the impingement to sense electrical voltage variances caused by a leak in the impingement, and that, if the contact is active, it is near enough to the impingement that its electrical signal will be affected by a leak in the impingement. It is preferred that the contacts are in electrical communication with an ammeter, which is also in electrical communication with the computer.

Active contacts will emit an electrical signal into the roofing envelope, and the signal will be picked up by another passive contact or contacts. These passive contacts may be dispersed throughout the roofing envelope or attached to the conductive impingements penetrating the roofing envelope. Measurements of these signals will give an indication of the moisture content between the active contact and the passive contacts that are receiving the signal promulgated by the active contact.

In preferred embodiments, a grid or array of contacts is dispersed throughout the roofing envelope at predetermined intervals, all or some of which may be either passive contacts or sensors; all or some of which may be active contacts; and all or some of which may be switched between active and passive contacts and vice versa. Depending on which contacts are switched to being passive sensors or active transmitters, the conductivity of any portion of the roofing envelope and, thus, the characterization of moisture within the roofing envelope may be determined.

The electrical communication between the contacts, the computer, and the ammeter (if included) may be wireless or wired. If wired, one wire may connect all contacts, both passive and active, to the computer and/or ammeter. Alternatively, each contact may have its own wire connecting it to the computer and/or ammeter. In addition, the wiring may be through any part of the roofing envelope, including on top of the roofing membrane or through the insulation package.

In its most basic form, the method of the present invention is performed by the system of the present invention as described above. In particular, the system performs the steps according to the instructions of the software program. The method includes the steps of causing the at least one passive contact to measure ambient voltage at its location; causing the at least one active contact to emit an electric signal; causing each of the passive contacts to measure voltage at their locations immediately upon the electric signal emission; mapping the voltages at the passive contact locations onto a geographic rendering of the contact locations; and analyzing the resultant map so as to determine a location of a leak in the roofing envelope. In preferred embodiments, the method of the present invention also includes one or more of the following steps: causing at least one of the contacts to switch between being active and passive so that at least one formerly active contact becomes a passive contact or vice versa; causing a newly active contact to emit an electric signal; causing each of the passive contacts to again measure voltage at their locations immediately upon the electric signal emission of the newly active contact; analyzing electric signal strength across various locations of passive contacts; determining which of the passive contacts should be switched to active contacts and vice versa based on the analysis so that the leak in the roofing envelope is more accurately mapped; varying the voltage of the electric signal emitted by the active contact based on the analysis of electric signal strength so that a leak in the roofing envelope is more accurately mapped; and measuring the electric potential between impingements and contacts.

The system and method of the present invention may be used advantageously with existing or new roofs and in combination with any of the systems disclosed in the Inventor's U.S. Pat. Nos. 8,566,051, 9,341,540, and 9,500,555 and U.S. patent application Ser. No. 14/061,480.

Therefore it is an aspect of the present invention to identify and locate leakage in single or multiple layered roofing and waterproofing membrane systems utilizing the principles of conductivity of moisture in a non-conductive medium, such as insulation.

It is a further aspect of the present invention to identify and locate leakage in new or existing single or multiple layered roofing and waterproofing membrane systems utilizing the principles of conductivity moisture in a non-conductive medium, such as insulation.

It is a further aspect of the present invention to identify and locate leakage in the roofing and waterproofing membrane systems utilizing the ability of conductive penetrations within the roofing envelope to aid in the identification and location of leakage.

It is a further aspect of the present invention to apply each of these principles to a single permanently installed, computer controlled, always-on system.

It is a further aspect of the present invention to have single or multiple electrodes wired back to the controlling computer.

It is a further aspect of the present invention to have contacts that report data back to the controlling computer by wireless means when in passive mode.

It is a further aspect of the present invention to provide electrical communication between the various system components through wires that may run on top of the roofing membrane or underneath and through the roofing envelope.

It is a further aspect of the present invention to identify and locate leakage in multi-layered roofing and waterproofing membranes utilizing the principles of dipole current flow measurement for the uppermost membrane using the same set of sensors and a different defined voltage.

It is a further aspect of the present invention to identify and locate leakage in an impingement of a multi-layered roofing and waterproofing membranes utilizing the principles of a completely electrically resistant material being compromised and made conductive by the addition of water utilizing a different set of sensors.

It is a further aspect of the present invention to provide a system that does not indicate false leaks by measuring trends of moisture accumulation within the roofing envelope.

These aspects of the present invention are not meant to be exclusive and other features, aspects, and advantages of the present invention will be readily apparent to those of ordinary skill in the art when read in conjunction with the following description, claims, and accompanying drawings.

BRIEF DESCRIPTION OF THE DRAWINGS

FIG. 4 is a diagram showing how contacts send and receive current between themselves and send current to a conductive impingement.

FIG. 5 is a diagram showing how contacts send and receive current between themselves and receive current from an impingement.

FIG. 6 is a flow chart showing the steps of the method of the present invention.

DETAILED DESCRIPTION

Figure 1:
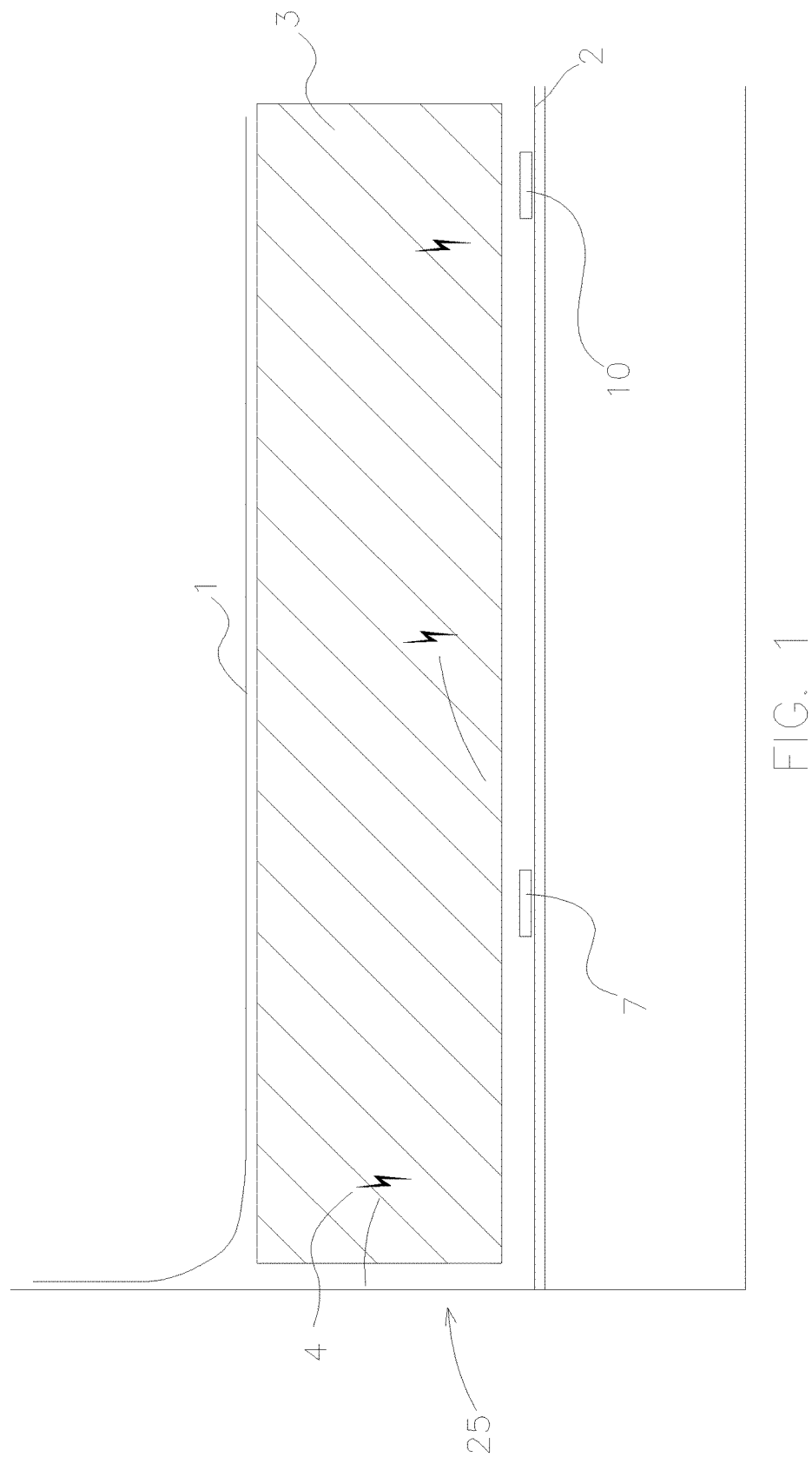
FIG. 1 is a diagram showing the disposition of contacts located in the roofing envelope, which is bordered by an impingement.

Referring first to FIG. 1, roofing or waterproofing membrane 1 is attached to impingement 25 and covers insulation package 3. In this embodiment, impingement 25 is a penetration or wall element. Contacts 7, 10 are placed on roof deck 2 or within the insulation package 3. Either contact 7 or 10 may serve as an active contact but, in this figure, contact 10 is the active contact and contact 7 is the passive contact. When the membrane 1 is not leaking, as is shown, electricity 4 generated by the active contact 10 or the conductive impingement 25 cannot be detected by the passive contact 7.

Figure 2:
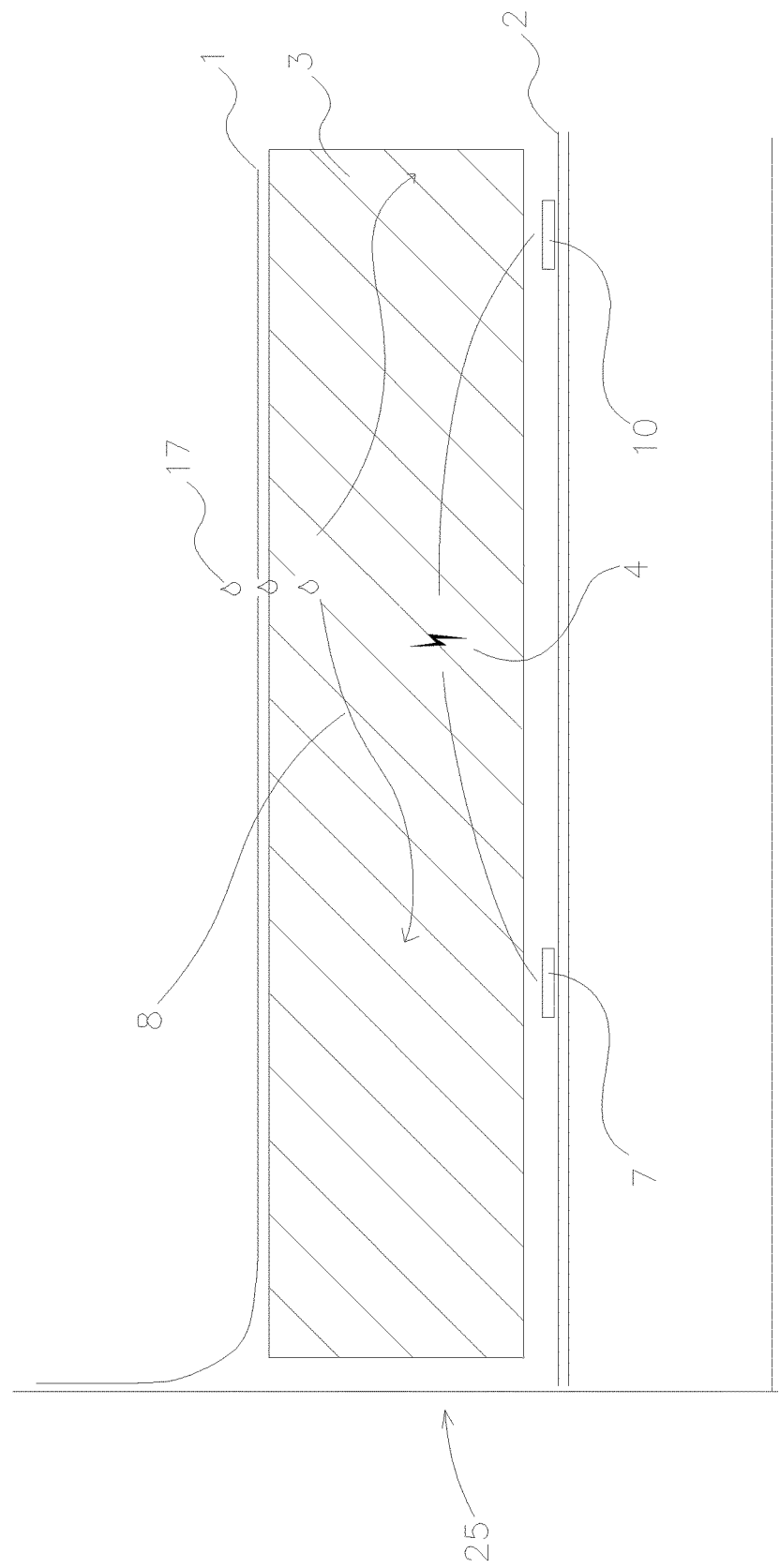
FIG. 2 is a diagram showing how a leak in the membrane is detected.

Referring now to FIG. 2, if membrane 1 develops a leak 17 between contacts 7, 10, water enters the insulation package 3 and permeates the insulation package, with the water permeation indicated by reference number 8. This causes an increase in conductivity 4, which is detected by one passive contact 7 receiving the current from the active contact 10. The passive contact 7 may also receive current from the conductive impingement 25.

Figure 3:
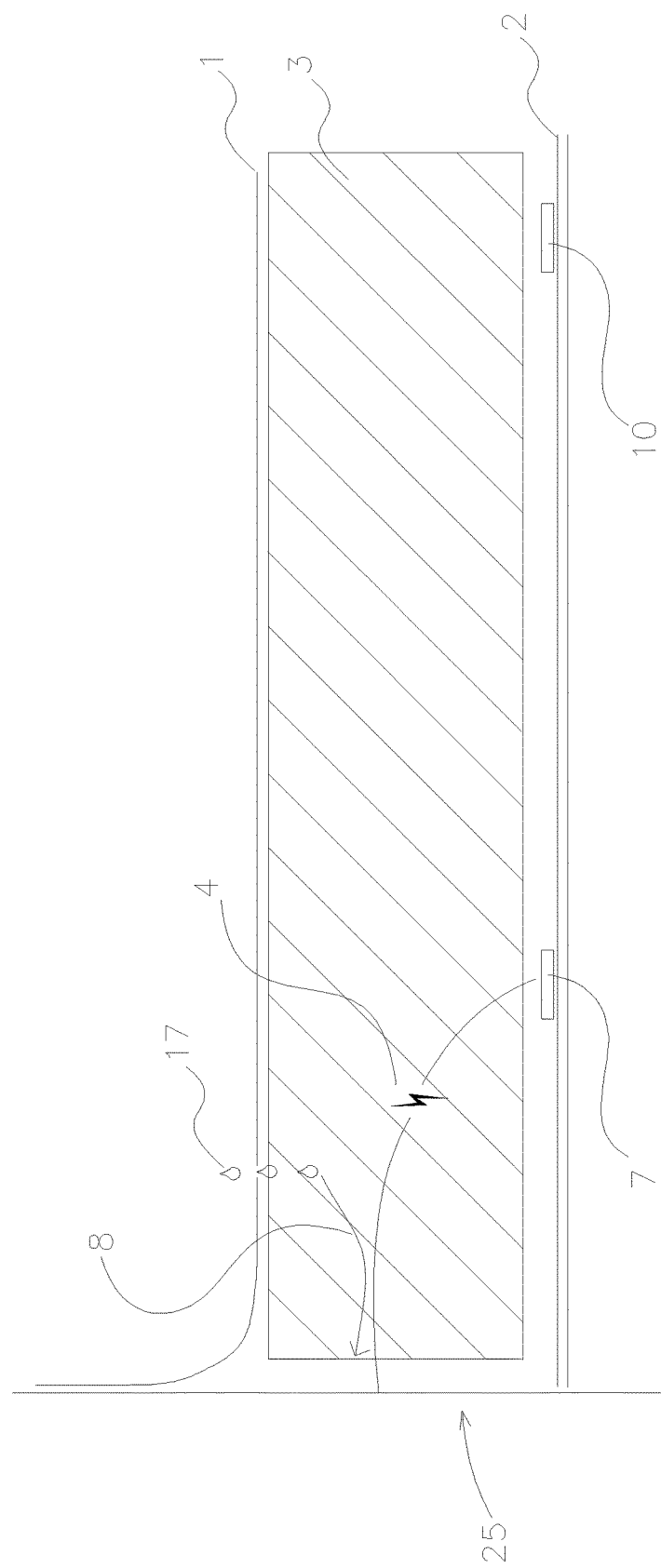
FIG. 3 is a diagram showing how a leak in the membrane near an impingement is detected.

Now referring to FIG. 3, if membrane 1 develops a leak 17 between a passive contact 7 and a conductive impingement 25, or at the impingement itself, water enters the insulation package 3 and permeates 8 the insulation package near that location. This causes an increase in conductivity 4, which is detected by the passive contact 7 nearest the impingement 25. The passive contact 7 may also receive some additional current from the active contact 10.

Now referring to FIG. 4, a scenario where conductive impingements 29 are passive is provided. In this embodiment a computer 13 controls the operation of a hub 14, which includes a voltage source and a switch. The hub 14 provides voltage to selected contacts 10 and switches the passive contacts 7 from listening mode to be active contacts 10 in active, transmitting mode via cable 16, which is connected to the contact grid 11. As moisture 8 increases in the insulation package 3, the electrical current 4 generated by the active contacts 10 and received by the passive contacts 7 and also received by the conductive impingements 29 also increases. The increase at each individual contact 7, 10 or impingement 29 is measured by the controlling computer 13, which makes adjustments in voltage provided to the active contacts 10 by the hub 14 to further identify the location of the leakage 17.

Now referring to FIG. 5, a scenario where conductive impingements 29 are active is provided. The computer 13 instructs the hub 14 to switch the active contacts 10 from active, transmitting mode to be passive contacts 7 in listening mode via cable 16, which is connected to the contact grid 11. As moisture 8 increases in the insulation package 3, the electrical current 4 generated by the active contacts 10 and received by the passive contacts 7 and also received by the conductive impingements 29 also increases. The increase at each individual contact 7, 10 or impingement 29 is measured by the controlling computer 13, which makes adjustments in voltage 14 to further identify the location of the leakage 17. Contacts 7, 10 attached to impingements 29 will determine the amount of current that reaches the impingements 29, the measurement of which will give an indication of the moisture content of the roofing envelope in the space between the active contact 10 and the particular conductive impingement 29.

It is noted that, although FIGS. 4 and 5 show and describe the computer 13 controlling the hub 14, in some embodiments, the computer 13 is a controller that is integral to the hub 13. In such embodiments, the hub 14 switches the contacts 7, 10 in a predetermined manner based upon the internal software and receives the voltage measurements from the passive contacts 7. The controller in turn processes and stores the voltage measurements in internal memory. In such embodiments, it is preferred that the combined hub 14 and controller output data corresponding to the voltage measurements to a processing computer (not shown), which includes software that processes this data and identifies the location of the leak.

It is known that moisture can conduct electricity and that the quantity of moisture per unit of volume of non-conductive material containing the moisture can be determined by the strength of a signal received from an electrode transmitting electricity on one point of the material to an electrode receiving that same signal on some other point of the same material. For instance, hand-held meters which determine moisture content in wood, concrete, soils or materials used in construction, etc. have two electrodes, one active, or transmitting, and one passive, or receiving, so that the active electrode transmits a certain voltage and the other passive, or receiving, electrode, spaced a certain distance (usually less than one inch) from the active electrode measures the voltage received. The measuring equipment calculates the drop in the strength of the signal from one electrode to the other and, because the distance is known, calculates the amount of moisture that will transmit the signal with that amount of decay. For several reasons, such a simple moisture probe is of limited use in both time and extent as far as application to roofing membranes, although a similar method of measurement may be applied to the interior of a roofing envelope. For example, because a roof is expansive; because the general condition of moisture in the entire roofing envelope is what is desired to be ascertained; because, taking the roof as a whole, the amount of moisture contained in any one area of the roof can vary significantly from moisture contained in another area of the roof; and because a graphical, topological or statistical representation of the roof is required to understand the distribution of moisture in the roof as a whole, such a simple moisture probe would not be effective for the current application.

If only one passive contact or sensor is used, the sensor or contact would receive ambient voltage from other conductive elements that penetrate the roofing envelope, such as metal vent stacks, metal curbs for mechanical equipment, etc., and other impingements. What is not well known is that these elements, or impingements or penetrations, that pass through the roofing envelope can indeed provide significant information regarding the condition of moisture in of the interior of the roofing envelope simply by being monitored by a single sensor in the roofing envelope which is somewhat removed from the penetrations. This is because as moisture increases in the roofing envelope, the interior of the envelope becomes more conductive and the weak voltage generated by these penetrations becomes more apparent. One sensor placed in the envelope would detect a simple increase in ambient voltage, while a plurality of sensors placed in the roofing envelope would detect the same increase in ambient voltage, but would also detect different levels of voltage depending on their spatial location in the envelope and the amount of moisture present in any part of the envelope. Using such sensors, or passive contacts, would be sufficient to determine if leakage were occurring in the roofing envelope. This is especially so if water were penetrating far enough to wet the vapor barrier or secondary membrane at the deck level.

With contacts that may switch between being active and passive, as with the system of the present invention, each sensor or contact would be able to generate voltage as well as receive the voltage signals from other sensors. Because the roofing envelope would certainly not become wet in all areas at the same time while the ambient moisture in the envelope would rise, if the sensors were placed in some sort of matrix fashion within the envelope, one sensor might be near an area that is experiencing leakage while other sensors might not be near areas experiencing such leakage. Thus, having individual sensors "fire" and having other sensors in the matrix receive and record the voltage at their location can provide an accurate "map" of the moisture conditions within the envelope. It is preferred that each sensor would fire for whatever duration is necessary for the other sensors to measure the voltage, and then the next sensor would fire while the other sensors or contacts measure that voltage, and so on. Additionally, when no sensors are actively firing, the sensors would monitor the ambient voltage within the roofing envelope which is generated by the metal or conductive impingements/penetrations, which extend through the envelope to the surface above. The information received from this background electrical noise is valuable if one monitors these changes in voltage over time and establishes trends, as leakage often occurs at these penetrations. Similarly, if one sensor fires and the resulting current is measured at any conductive impingement/penetration penetrating the roofing envelope, an idea of the conductivity, and therefore the moisture content within the roofing envelope in that particular area is ascertainable.

Now referring to FIG. 6, the steps of method 100 of the present invention are shown. Method 100 includes the steps of causing the at least one passive contact to measure ambient voltage at its location 102; causing the at least one active contact to emit an electric signal 104; causing each of the passive contacts to measure voltage at their locations immediately upon the electric signal emission 106; mapping the voltages at the passive contact locations onto a geographic rendering of the contact locations 108; and analyzing the resultant map so as to determine a location of a leak in the roofing envelope 110.

Method 100 also preferably includes the steps of: causing at least one of the contacts to switch between being active and passive so that at least one formerly active contact becomes a passive contact or vice versa 112; causing a newly active contact to emit an electric signal 114; causing each of the passive contacts to again measure voltage at their locations immediately upon the electric signal emission of the newly active contact 116; analyzing electric signal strength across various locations of passive contacts 118; determining which of the passive contacts should be switched to active contacts and vice versa based on the analysis so that the leak in the roofing envelope is more accurately mapped 120; varying the voltage of the electric signal emitted by the active contact based on the analysis of electric signal strength so that a leak in the roofing envelope is more accurately mapped 122; and measuring the electric potential between impingements and contacts 124.

Steps 118 and 120 entail the controlling computer being fitted with logic that determines, through amperage and signal decay readings, which sensors should be passive, and in the listening mode, and which sensors should be active, and in the transmitting mode, so that the location of water leakage that permeates roofing envelope may be more accurately identified.

Step 122 entails the controlling computer being able to vary the voltage of the active transmitting contacts to further aid in the identification of the location of water leakage that permeates the roofing envelope Step 124 of measuring the electric potential between impingements and contacts may between active or passive contacts, as shown in FIGS. 4 and 5.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A system for detecting and locating leaks in a roofing envelope where the roofing envelope includes a roofing membrane, an insulation package, and a roof deck, wherein the roofing membrane covers the insulation package and the insulation package is disposed on top of the roof deck, said system comprising:
   a plurality of contacts disposed within the roofing envelope, wherein each of said plurality of contacts serves as either an active contact that emits an electric signal of a known voltage or a passive contact that receives an electric signal and reads a voltage of the electric signal, and wherein each of said plurality of contacts switches between serving as an active contact and a passive contact such that at least one of said plurality of contacts is an active contact and at least one of said plurality of contacts is a passive contact, at all times;
   a hub in electrical contact with each of said plurality of contacts, wherein said hub is capable of selectively providing voltage to at least one of said plurality of contacts;
   a computer in communication with said hub that controls the provision of voltage by said hub, said computer comprising a processor, a memory, and a software product stored in said memory and executable by said processor, wherein said software product comprises software instructions for:
      determining which of said plurality of contacts are active contacts and which of said plurality of contacts are passive contacts;
      causing said hub to supply voltage to said active contacts;
      receiving, measuring, and analyzing the strength of an electric signal received by said passive contacts;
      determining which of said passive contacts should be switched to active contacts and which of said active contacts should be switched to passive contacts based on the analysis such that a leak in the roofing envelope is more accurately identified;
      switching at least one of said at least one active contacts into a passive contact;
      switching at least one of said at least one passive contacts into an active contact; and
      varying a voltage of the electric signal emitted by said at least one active contact based on the analysis so that a leak in the roofing envelope is more accurately identified;
   whereby the leak in the roofing envelope is detected and located.

2. The system as claimed in claim 1, wherein the roofing envelope also includes at least one impingement that impinges on at least the roofing membrane, and at least one of said plurality of contacts is disposed proximate to the at least one impingement.

3. The system as claimed in claim 1, further comprising an ammeter, wherein said contacts are in electrical communication with said ammeter and said ammeter is in electrical communication with said computer.

4. A method for detecting and locating leaks in a roofing envelope where the roofing envelope includes a roofing membrane, an insulation package, and a roof deck, wherein the roofing membrane covers the insulation package and the insulation package is disposed on top of the roof deck, wherein the method is performed by a system including at least two contacts disposed within the roofing envelope, including at least one active contact, wherein the at least one active contact is capable of emitting an electric signal of a known voltage; and at least one passive contact, wherein the at least one passive contact is capable of receiving and measuring the strength of an electric signal; and a computer in electrical communication with the contacts, wherein the computer includes a processor, a memory, and a software product, wherein the software product is stored in the memory and executable by the processor, said method comprising the steps of:
   the at least one passive contact measuring ambient voltage at the location of the at least one passive contact;
   the at least one active contact emitting an electric signal;
   each of the at least one passive contact measuring voltage at the location of the at least one passive contact immediately upon the electric signal emission of the at least one active contact;
   switching at least one of the contacts between being active and passive such that at least one formerly active contact becomes a passive contact and at least one formerly passive contact becomes an active contact;
   mapping the voltages at the locations of the at least one passive contact onto a geographic rendering of the locations of the contacts;
   analyzing the resultant map;
   varying a voltage of the electric signal emitted by the at least one active contact based on the analysis of electric signal strength so that a leak in the roofing envelope is more accurately mapped; and
   determining a location of a leak in the roofing envelope, whereby the leak in the roofing envelope is deleted and located.

5. The method as claimed in claim 4, further comprising the steps of:
   a newly active contact emitting an electric signal; and
   each of the at least one passive contact measuring voltage at the location of the at least one passive contact immediately upon the electric signal emission of the newly active contact.

6. The method as claimed in claim 4, further comprising the steps of:
   analyzing electric signal strength across various locations of the at least one passive contact; and
   determining which of the passive contacts should be switched to active contacts and which of the active contacts should be switched to passive contacts based on the analysis so that the leak in the roofing envelope is more accurately mapped.

7. The method as claimed in claim 4, further comprising the steps of
   analyzing electric signal strength across various locations of the at least one passive contact.

8. The method as claimed in claim 4, wherein the roofing envelope in which leaks are detected and located further comprises at least one impingement penetrating the roofing membrane, and said method further comprising the step of measuring the electric potential between impingements and contacts.

* * * * *